(12) United States Patent
Eleftheriou et al.

(10) Patent No.: US 7,370,467 B2
(45) Date of Patent: May 13, 2008

(54) TURBOFAN CASE AND METHOD OF MAKING

(75) Inventors: Andreas Eleftheriou, Woodbridge (CA); Kevin Walter Lobo, Mississauga (CA); Maurice Weinberg, Toronto (CA); Quantai Liu, Mississauga (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 456 days.

(21) Appl. No.: 10/628,556

(22) Filed: Jul. 29, 2003

(65) Prior Publication Data

US 2005/0022501 A1 Feb. 3, 2005

(51) Int. Cl.
*F02K 3/00* (2006.01)
*F02K 3/06* (2006.01)
(52) U.S. Cl. ........................ 60/226.1; 60/797
(58) Field of Classification Search ............... 60/226.1, 60/796, 798
See application file for complete search history.

(56) References Cited

U.S. PATENT DOCUMENTS

| | | | |
|---|---|---|---|
| 2,404,334 A | 7/1946 | Whittle | |
| 2,879,959 A | 3/1959 | Morrison et al. | |
| 3,720,060 A | 3/1973 | Davies et al. | |
| 3,814,549 A * | 6/1974 | Cronstedt | 60/226.1 |
| 4,043,522 A | 8/1977 | Vetter | |
| 4,055,041 A | 10/1977 | Adamson et al. | |
| 4,063,847 A | 12/1977 | Simmons | |
| 4,122,672 A * | 10/1978 | Lowrie | 60/226.1 |
| 4,132,069 A | 1/1979 | Adamson et al. | |
| 4,502,276 A | 3/1985 | Pask | |
| 4,598,600 A | 7/1986 | Knowles | |
| 4,716,721 A | 1/1988 | Pask et al. | |
| 4,722,184 A * | 2/1988 | Chaplin et al. | 60/226.1 |
| 4,790,133 A * | 12/1988 | Stuart | 60/226.1 |
| 4,825,648 A | 5/1989 | Adamson | |
| 4,872,767 A | 10/1989 | Knapp | |
| 5,076,049 A | 12/1991 | Von Benken et al. | |
| 5,080,555 A | 1/1992 | Kempinger | |
| 5,083,426 A | 1/1992 | Layland | |
| 5,157,915 A | 10/1992 | Bart | |
| 5,207,054 A | 5/1993 | Rodgers et al. | |
| 5,299,910 A | 4/1994 | Gilchrist | |
| 5,357,744 A | 10/1994 | Czachor et al. | |
| 5,367,874 A | 11/1994 | Auffret et al. | |
| 5,372,338 A | 12/1994 | Carlin et al. | |
| 5,409,184 A | 4/1995 | Udall et al. | |
| 5,797,684 A | 8/1998 | Becker | |
| 5,832,715 A | 11/1998 | Dev | |
| 5,899,660 A | 5/1999 | Dodd | |
| 5,924,288 A | 7/1999 | Fortuna et al. | |

(Continued)

FOREIGN PATENT DOCUMENTS

GB 2 070 691 9/1981

(Continued)

OTHER PUBLICATIONS

The Modern Gas Turbine (Rolls-Royce, 2000).

*Primary Examiner*—Ted Kim
(74) *Attorney, Agent, or Firm*—Ogilvy Renault LLP

(57) ABSTRACT

A casing for a gas turbine includes a fan case, an intermediate case and a gas generator case integrated with one another.

8 Claims, 11 Drawing Sheets

U.S. PATENT DOCUMENTS

| | | | |
|---|---|---|---|
| 6,109,022 A * | 8/2000 | Allen et al. | 60/226.1 |
| 6,145,300 A * | 11/2000 | Romani | 60/226.1 |
| 6,148,600 A | 11/2000 | Farmer et al. | |
| 6,151,882 A | 11/2000 | Cavanagh | |
| 6,241,465 B1 | 6/2001 | Ulma et al. | |
| 6,305,899 B1 | 10/2001 | Saunders | |
| 6,308,915 B1 | 10/2001 | Liston et al. | |
| 6,371,721 B1 | 4/2002 | Sathianathan et al. | |
| 6,532,731 B2 * | 3/2003 | Springer | 60/226.1 |
| 6,910,851 B2 | 6/2005 | Franconi et al. | |
| 6,931,862 B2 * | 8/2005 | Harris | 60/733 |
| 2003/0110778 A1 | 6/2003 | Karafillis et al. | |
| 2005/0058541 A1 | 3/2005 | Le Blez et al. | |

FOREIGN PATENT DOCUMENTS

GB        1 605 252        6/1986

\* cited by examiner

TURBOFAN CASE AND METHOD OF MAKING

THE FIELD OF THE INVENTION

This invention relates to gas turbine engines, and more particularly to a case for a turbofan engine.

BACKGROUND OF THE INVENTION

Affordable, "personal" jet aircraft are fast becoming a reality in the general aviation market, very small turbofan engines are required for power. Such aircraft require "very small" turbofan engines (i.e. 2000 pounds thrust and under) which can be economically operated by the general aviation pilot. Small scale turbofan gas turbine engines are known for use in expendable missiles in the delivery of military ordinance, however considerations such as cost-effective, affordable and efficient operation, and durability measured in thousands of hours (not minutes), have been irrelevant to their designers. Such prior art missile engine designs, therefore, provide none of the key deliverables required for such a market to be realized. Likewise, industrial microturbines are available, but their designs are ill-suited for use as an aircraft prime mover, for obvious considerations such as weight and size.

Scaling down of conventional civilian non-expendable turbofan engines, however, also presents difficulties due mainly to the disproportionate scaling of certain factors, such as strength to weight and tolerances. For example, non-expendable turbofan engines typically have a segmented case assembly, mainly for weight reduction reasons, but also to facilitate fabrication and assembly. A conventional case assembly 200 is illustrated in FIG. 1, and includes a fan case 202, an intermediate case 204, a compressor case 206, a gas generator case 208, a turbine case 210 and a turbine exhaust case 211 about centreline 212. The gas generator case 208, turbine case 210 and turbine exhaust case 211 surround the hot section of the engine and are typically made of steel or nickel alloys, which have good thermal resistance properties. However steel is relatively heavy, and therefore cooler portions such as the intermediate case 204 and the compressor case 206 typically employ lighter materials such as magnesium and/or aluminium. Steel is conventionally used for the fan case 202 because its strength is desirable for containing blade-off events.

A similar prior art configuration 300 is illustrated in FIG. 2, a case assembly 300 (only the upper half of which is shown), having a fan case 344, an intermediate case 346, and a gas generator case 352 (the turbine and exhaust cases are not shown) bolted together, along centreline 312. A compressor shroud 348 for encircling the compressor blades is bolted to the intermediate case 346, as is a bearing seat (not shown) at location 357. Flange connections 302, 304 and 306 are provided to accommodate differences in thermal expansion rates amongst the different material case components. Typically the case components are assembled in stages, as the engine component top-level assemblies are assembled therein.

Simply scaling down these larger case designs, however, becomes problematic in "very small" turbofan engines (i.e. generally 2000 pounds thrust, and less) for several reasons. One is the associated tolerance "stack-up", which typically does not scale (i.e. the accuracy of manufacturing and assembly process does not increase as part size decreases). In typical turbofan engines, tolerance stack-up is less critical because it is small compared to the size of the components. But when considering blade tip clearance for example, the tolerance stack-up can have a very significant effect on the overall efficiency of a very small turbofan engine, since specific fuel consumption (SFC) is directly related to blade tip clearance. Any blade tip clearance must account for a tolerance stack-up, to avoid tip rubs caused by an unfavourable stack-up, and so tolerance stack-up directly affects efficiency. Another scaling problem is that factors often scale at different rates. For example, a component reduced to nominally half its original size, may not necessarily be halved in weight.

Another aspect which presents challenges to scaling down size is the differences in thermal expansion rates, which requires compensation and thereby adds weight and complexity. For example, the accessory gear box (AGB) tower shaft typically requires a telescoping design (and associated bearings) to account for thermal expansion differential. In the very small turbofan engine, such accommodations make the engine unfeasible expensive and inefficient to operate.

Therefore, as the affordable general aviation turbofan engine market develops, significant design problems are presented to the designer. Scaled-down turbofans are simply inefficient and heavy, and thus too expensive to operate in the general aviation market. Civilian version of expendable missile engines and airborne version of microturbines are also ineffectual solutions to the design problems presented. Thus, it is important to address the design problems of the very small turbofan engine.

SUMMARY OF THE INVENTION

One object of the present invention is to provide an improved gas turbine engine case for use in a very small gas turbine engine.

In accordance with one aspect of the present invention there is provided a casing for a turbofan engine which includes at least a fan assembly, a compressor assembly, a combustor assembly and a turbine assembly. The casing comprises a fan case portion, an intermediate case portion, and a gas generator case portion. The fan case portion, the intermediate case portion and the gas generator portion are integrally joined together, thereby forming an integral casing.

In accordance with another aspect of the present invention, there is provided a bypass turbofan engine. The bypass turbofan engine comprises at least a fan, a compressor, and a gas generator disposed in flow series within the engine, and a bypass airflow defined around at least the compressor and gas generator. A one-piece casing is provided, substantially encasing the fan, compressor and the gas generator.

In accordance with a further aspect of the present invention, there is provided a turbofan engine for aircraft, the turbofan engine comprising a rotating assembly which includes a propulsive fan portion, a compressor portion, and a gas generator portion. The rotating assembly has an axial length. A generally tubular casing assembly ias provided, enveloping the rotating assembly substantially along the axial length thereof, and thereby defining a main flow path through the engine. The casing assembly is an integrated single piece.

In accordance with a still further aspect of the present invention, there is provided a method of reducing the weight of a turbofan engine which includes a casing assembly. The method comprises a step of providing a one-piece integrated case to surround the turbofan engine and an associated bypass flow.

In accordance with a yet further aspect of the present invention, there is provided a method of assembling a gas turbofan engine for aircraft. The method comprises steps of providing a gas turbofan engine casing assembly including a fan case, an intermediate case and a gas generator case; placing a propulsive fan assembly, a compressor assembly, and a gas generator assembly into the casing assembly; and completing the assembly of the engine by mounting other components to the casing assembly.

It should be noted that the terms of "integral", "integrating" and "integrated" used throughout the text of this application and appended claims, are intended to mean items which are integrally joined such that disassembly (in a typical non-destructive sense) is not possible.

Among other things, the integral turbofan engine casing of the present invention allows for a final machining operation to the casing assembly after assembly to reduce the tolerance accumulation in the assembly. Therefore, the present invention advantageously provides a method of assembling a turbofan engine in which a smaller minimum blade tip clearance and other stack-ups are achieved. The integral casing assembly also reduces the number of flange connections in the casing assembly which, despite the use of a typically heavier material throughout the casing, surprisingly reduces the overall weight of a very small turbofan engine. Furthermore, the integral engine casing also permits a much-needed reduction in thermal expansion differentials, thereby permitting a cost-efficient design to be provided for general aviation very small turbofan engines.

Other features and advantages of the present invention will be better understood with reference to the preferred embodiments described hereinafter.

BRIEF DESCRIPTION OF THE DRAWINGS

Having thus generally described the nature of the present invention, reference will now be made to the accompanying drawings, showing by way of illustration the preferred embodiments thereof, in which.

DETAILED DESCRIPTION OF THE PREFERRED EMBODIMENTS

Figure 1:
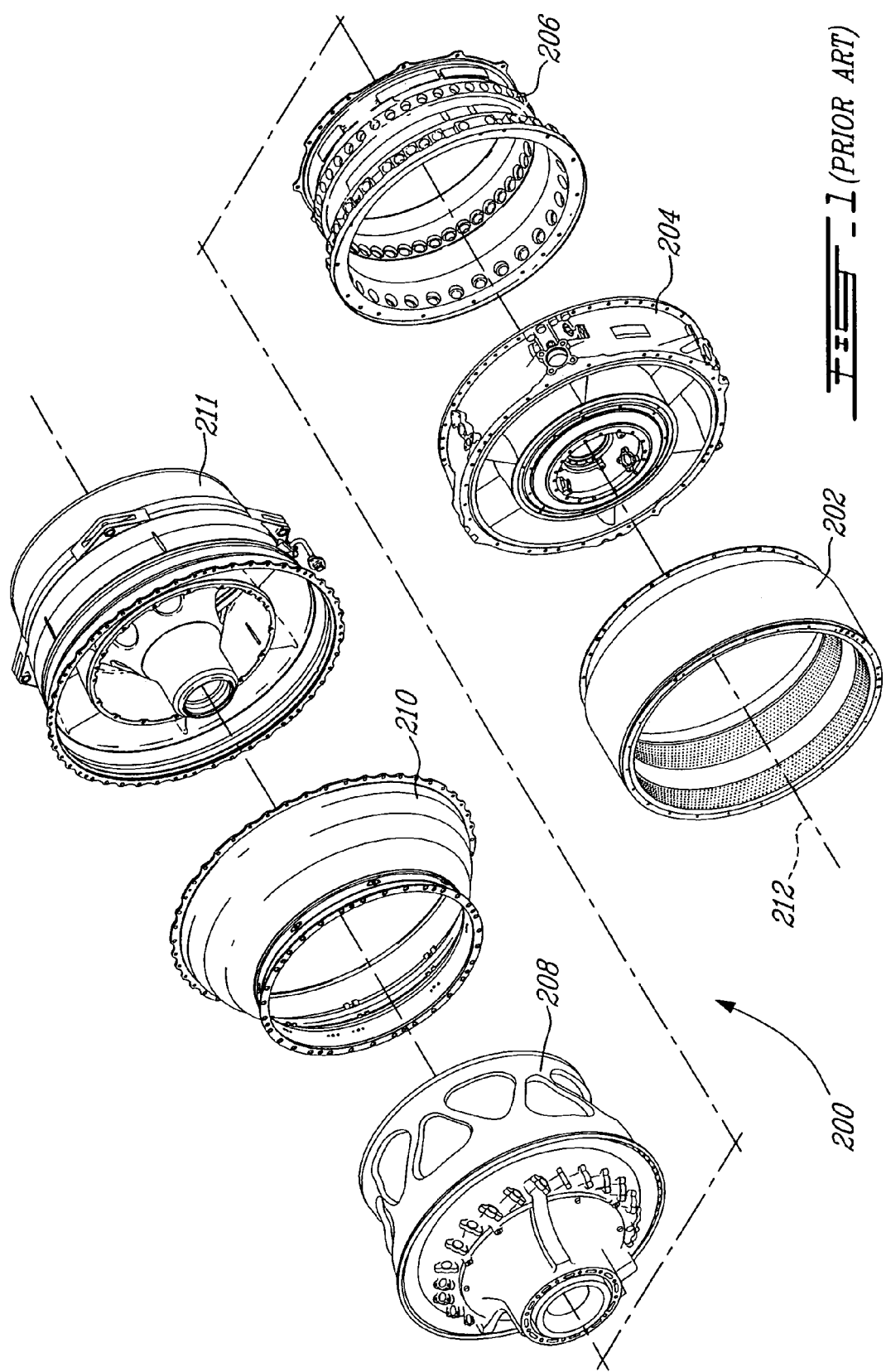
FIG. 1 is a simplified exploded perspective view of a conventional case assembly of a turbofan engine.
Figure 2:
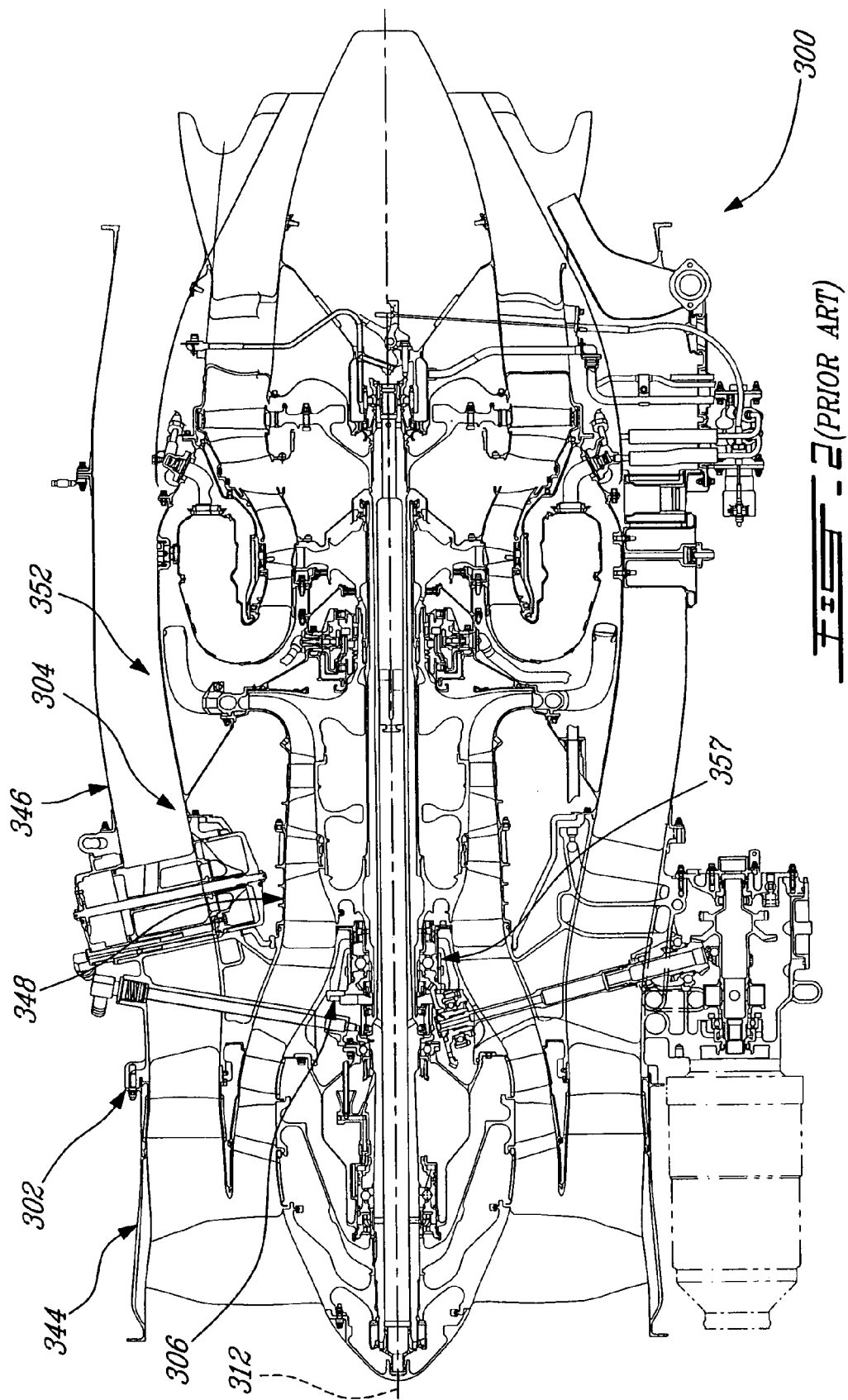
FIG. 2 is a schematic cross-sectional view of a similar conventional case assembly.
Figure 3:
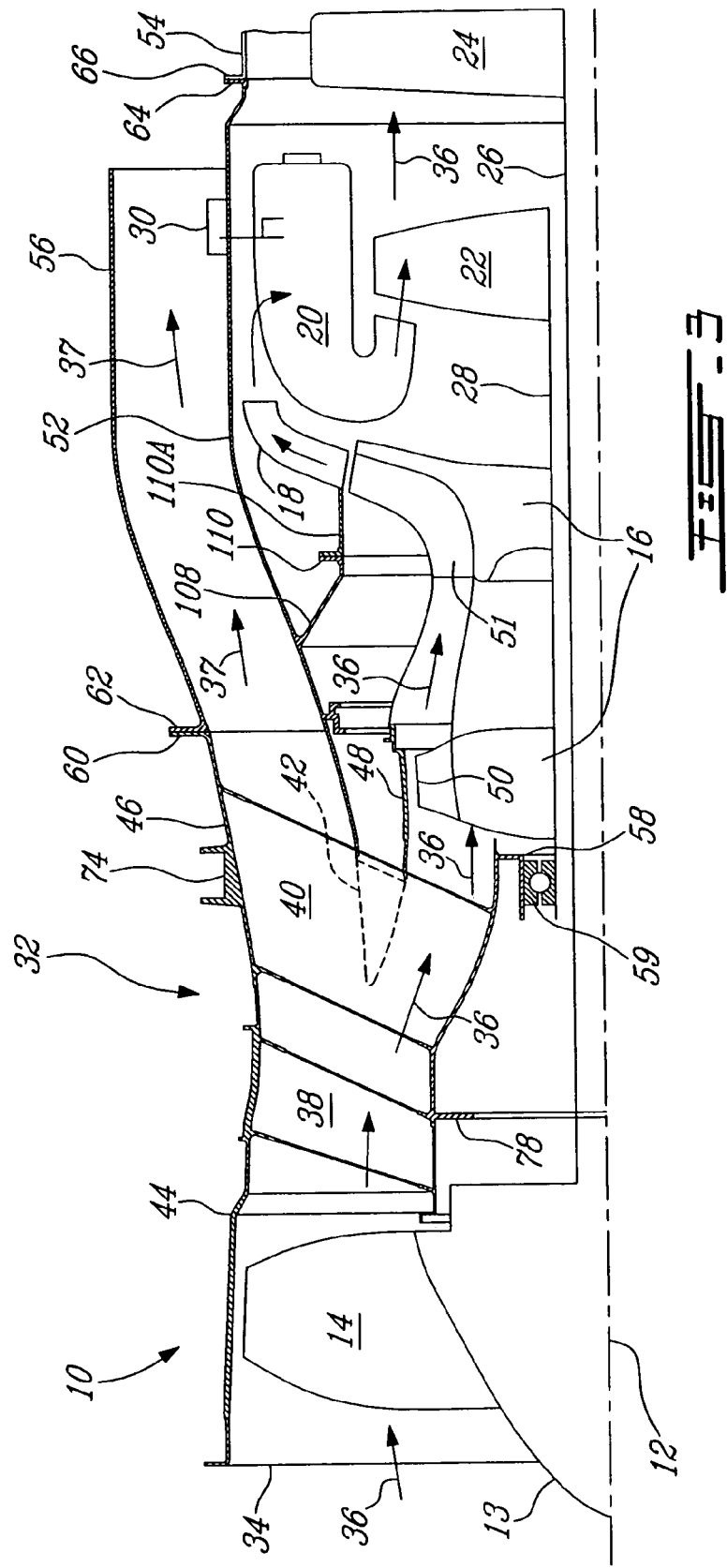
FIG. 3 is a schematic cross-sectional view of a turbofan case according to the present invention.

Referring to the drawings, beginning with FIG. 3, an non-expendable exemplary turbofan gas turbine engine 10 according to the present invention includes in serial flow communication about a longitudinal central axis 12, a fan assembly 13 having a plurality of circumferentially spaced fan blades 14, a compressor section 16 having a plurality of circumferentially spaced low pressure compressor (LPC) blades 50 and high pressure compressor (HPC) blades 51, a diffuser 18, a combustor 20, a high pressure turbine (HPT) 22, and a low pressure turbine (LPT) 24. LPT 24 is connected to the fan assembly 13 by a first or low pressure (LP) shaft 26, and HPT 22 is connected to compressor assembly 16 by a second or high pressure (HP) shaft 28. Fuel injecting means 30 are provided for injecting fuel into the combustor 20 assembly 16 by a second or high pressure (HP) shaft 28. Fuel injecting means 30 are provided for injecting fuel into the combustor 20.

A generally tubular casing assembly 32 having a envelops the engine 10 and thereby defines a main flow path 36 through the core of engine 10, extending from an inlet 34 to an exhaust outlet (not shown), and a by-pass flow path 37.

Figure 4:
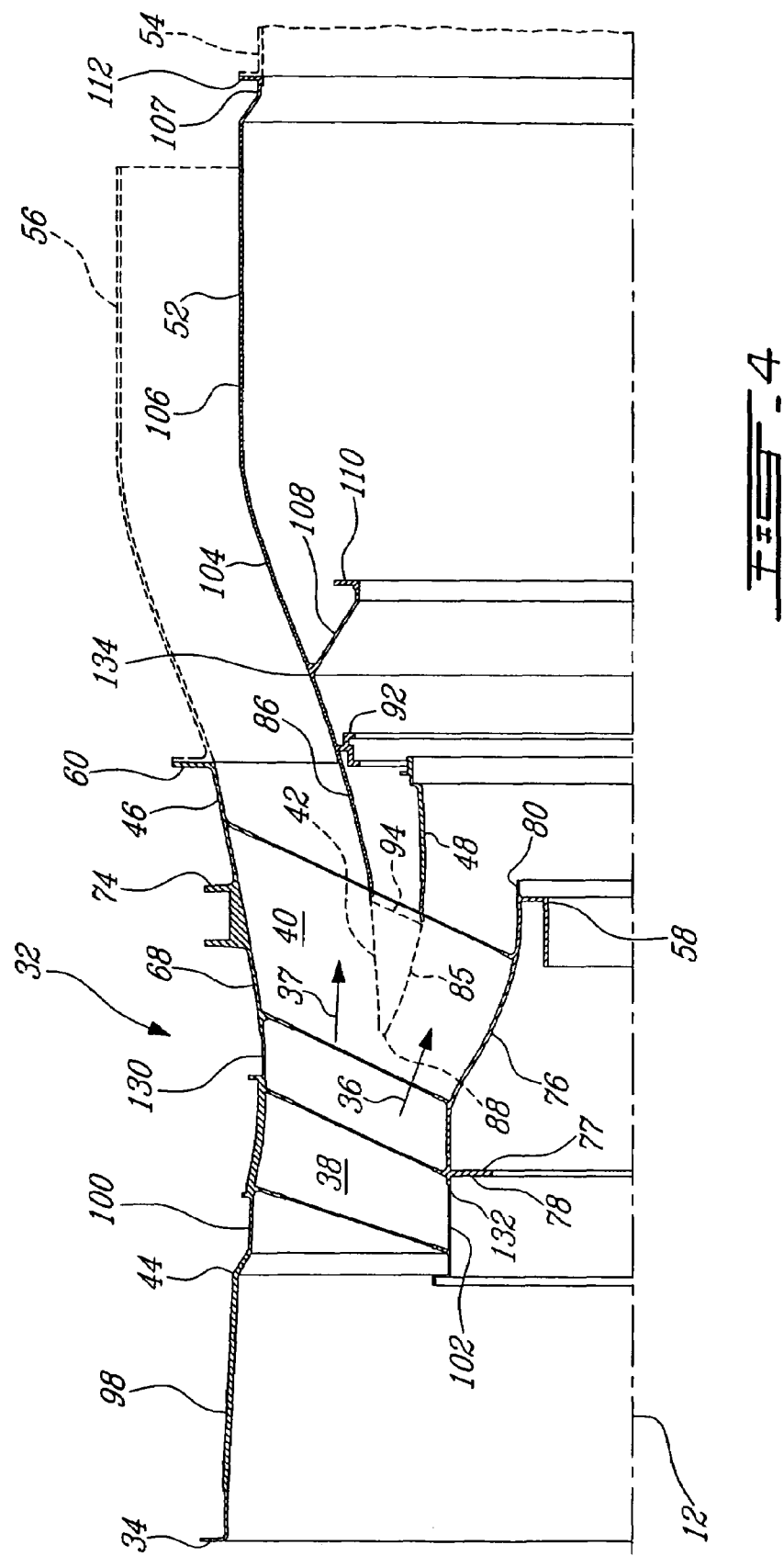
FIG. 4 is a schematic partial cross-sectional view of the embodiment of FIG. 3.
Figure 6:
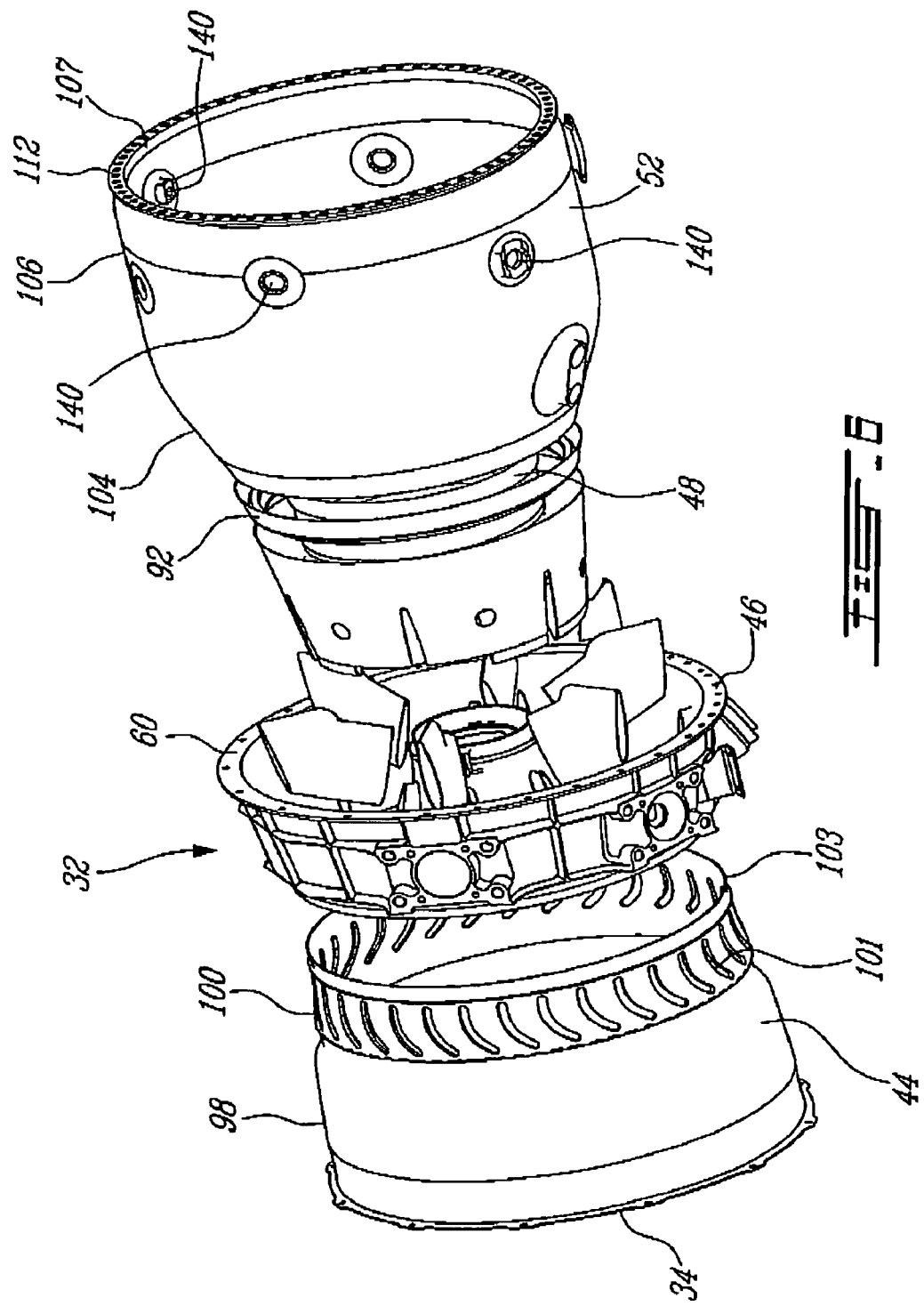
FIG. 6 is an exploded isometric view of the assembly of FIG. 4, illustrating the assembly sequence of the intercase portion of FIG. 5.
Figure 7:
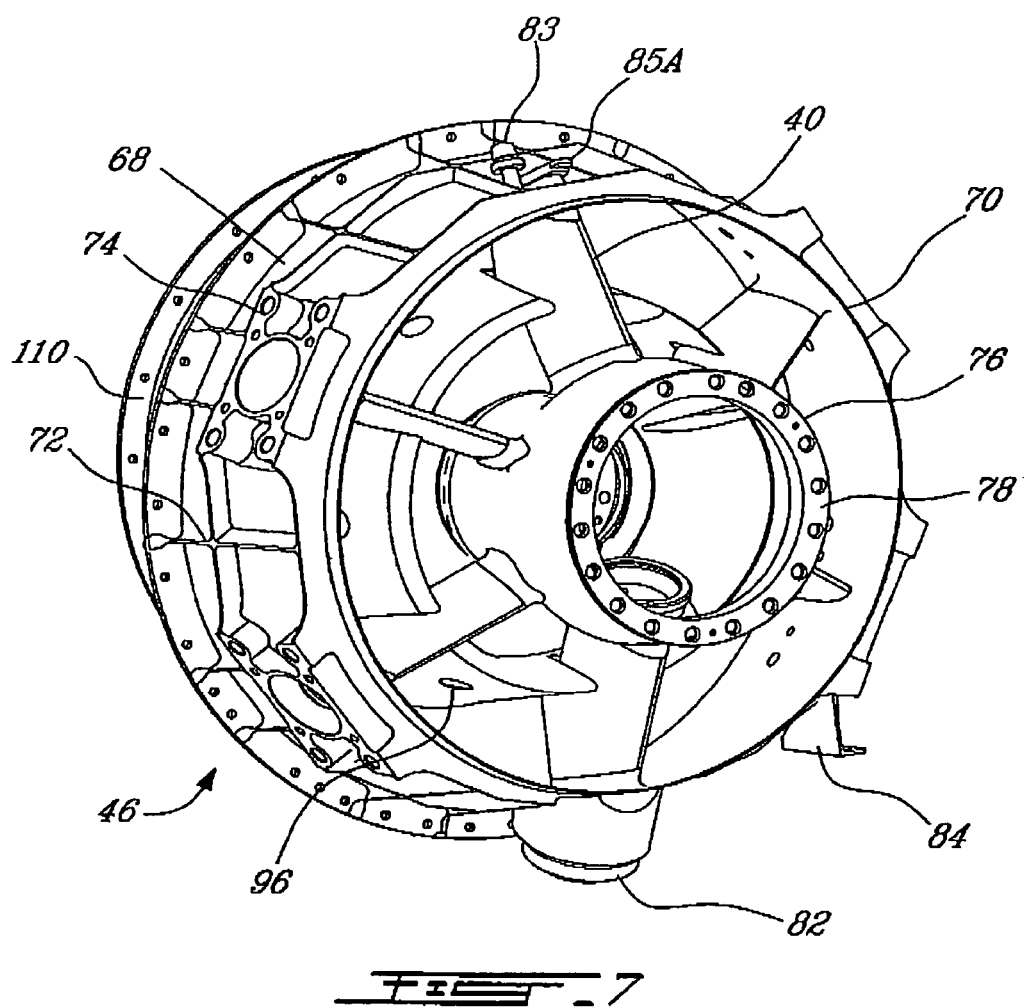
FIG. 7 is an isometric front view of the intercase portion shown in FIGS. 5 and 6.
Figure 8:
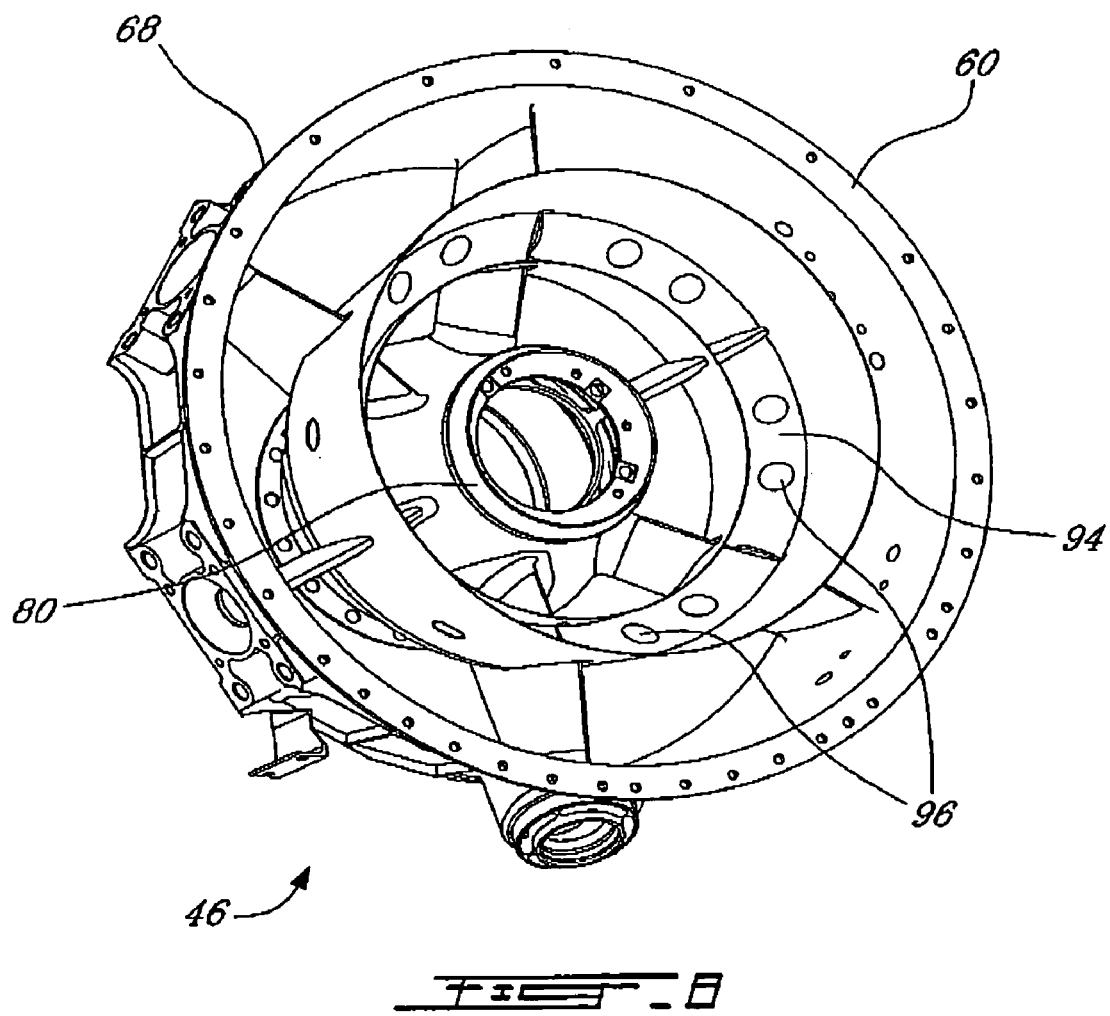
FIG. 8 is an isometric rear view of the intercase portion shown in FIGS. 5-7.

Referring to FIGS. 3, 4 and 6, the casing assembly 32 according to one embodiment of the present invention includes a generally tubular fan portion or "case" 44, which houses the fan rotor assembly 13, a generally tubular intercase or intermediate portion or "case" 46 downstream of fan case 44 and a gas generator portion or "case" 52 downstream of intermediate portion 46. The intermediate portion 46 includes a compressor shroud 48 which encircles the blade tips of the compressor assembly 16, and a bearing seat 58 for mounting the HP shaft bearing 59 thereto, as will be described further below.

Figure 5:
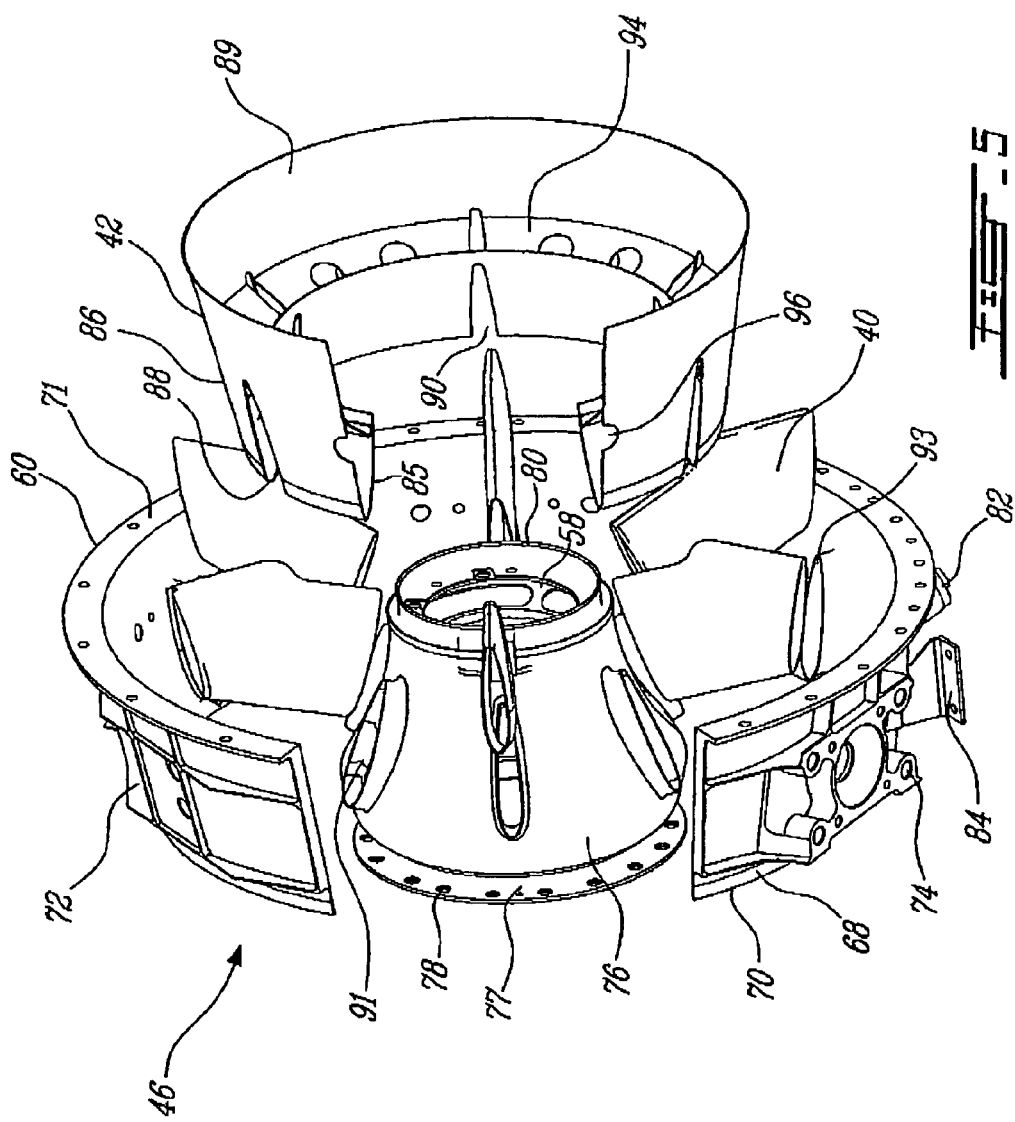
FIG. 5 is a exploded isometric view, with a portion cut away, of an intermediate portion of the assembly of FIG. 4.

With reference to FIGS. 5 and 6, gas generator portion 52, which is also generally tubular in shape, is for housing the combustor 20 and perhaps HPT 22 or a section thereof. A generally tubular case turbine and exhaust case 54 is preferably modularly provided and mounted to (i.e. not integrated with) the aft end 107 of gas generator case 52 for housing the LPT 24, and supporting an exhaust mixer assembly (not shown).

The engine 10 further includes a tubular bypass duct case 56, preferably modularly provided and mounted to (i.e. not integrated with) the intermediate portion 46 of casing assembly 32. The tubular bypass duct case 56 generally surrounds the gas generator portion 52 and is radially spaced apart therefrom, thereby defining a downstream section of the bypass 44 therebetween.

Rather than providing a prior art segmented case, in which the case components are removably mounted to one another, the present invention provides a single-piece casing assembly 32 in which all casing components are integrally attached to one another. Referring again to FIG. 3, fan case portion 44, intermediate case portion 46, compressor shroud portion 48, bearing mount 58 and gas generator portion 52 of casing assembly 32 are all integrally joined to one another, such as by welding, or by other process such as integral fabrication, brazing or other methods of joining and bonding the components into one piece. Preferably, the bypass duct case 56 is not integrated with casing 32, in order to provide convenience in assembly and maintenance of the engine assembly 10, and so rather is connected by bolting together mating flanges 60 and 62 which extend radially from the respective intermediate portion 46 and the bypass duct case 56. The turbine and exhaust case 54, as mentioned, is also preferably mounted to the aft end of the casing 32 by, for example, bolting together mated flanges 64 and 66. The bypass duct 56 and the case 54 are shown by broken lines in FIG. 4 to distinguish them from other cases which are most preferably integrated to form the integral case of the present invention. Casing assembly 32 can also integrally include the bypass and exhaust ducts, if desired.

The individual components of casing 32 are preferably made from one material, for example steel, although a combination of materials may be used (e.g. steel and Inconel, etc.) as long as the desired integral bonding technique (e.g. welding) permits such materials to be reliably bonded together. The individual portions of the casing are preferably made separately, as will be described further below, which would permit, for example, a variety of processes and materials to be used. Optionally, the casing 32 may be formed integrally substantially in a single operation, such as metal injection moulding.

Surprisingly, although the entire casing 32 of the present invention may be made from a relatively heavy material such as steel, in very small turbofan engines (i.e. preferably 2000 pounds thrust and less, more preferably 1500 pounds thrust and less, and most preferably about 1000 pounds thrust or less) the present invention provides unexpected and significant benefits which directly impact on engine SFC, as will now be described.

Firstly, even though a heavier material is used throughout (e.g. steel versus, say, magnesium), the weight savings from reduced flange count is surprisingly significant. Even scaled-down flanges represent a significant weight relative to the very small turbofan engine, and thus it has been found that their removal results in a disproportionate weight savings despite the addition of weight elsewhere in the casing, contrary to the teachings of the prior art. Therefore, contrary to the teachings of the prior art, it has been found that a segmented case permitting the use of lighter materials is actually heavier in the very small turbofan range. A beneficial redistribution of weight is therefore provided by the present invention.

Secondly, the reduction of flange connections also beneficially reduces tolerance stack-up by reducing the number of toleranced parts and connections. Accordingly, for example by integrating the compressor bearing mount and compressor shroud into a single part, a significantly smaller compressor blade tip clearance may be provided.

Thirdly, the reduction of thermally mismatched parts also permits a significant simplification to the very small turbofan engine. In a first aspect, the reduction of thermal mismatch improves the tolerances which must be left in connections. In a second aspect, by improving thermal mismatch within the casing 32, the interface with other systems, such as the accessory gearbox (AGB) is greatly simplified.

In a second aspect of the present invention, a configuration for casing 32 is disclosed which provides further benefits to the very small turbofan. Referring to FIGS. 4 and 5, the structure of the intermediate portion 46 of casing 32 will now be described in more detail. The intermediate portion 46 includes an annular outer portion or outer ring 68 having a forward end 70 and a rearward end 71 integrated with the radially outwardly extending bypass duct flange 60. On the external surface of the outer ring 68 are provided stabilizing ribs 72, which reinforce the rigidity of the outer ring 68, and engine mounts 74 which also assist in this regard. A mounting support 82 on the outer ring 68 is provided for operatively supporting the AGB tower shaft (not shown), and to provide further stiffness to ring 68. Also provided on the outer ring 68 are attachment brackets 84 for attaching the AGB. Other services, such as oil tube inlet 83 and Ni probe boss 85A, are also provided.

The intermediate portion 46 of casing 32 also includes an annular inner portion including an inner hub 76 which has a forward end 78 and a rearward end 80. The inner hub 76 is positioned coaxially with the outer ring 68 and is supported within the outer ring 68 by a plurality of casing struts 40 which are circumferentially spaced apart and extend radially outwardly and generally rearwardly from the inner hub 76 to the outer ring 68, as will be described further below. The annular bearing seat 58 which receives and supports preferably the HPC bearing 59 (see FIG. 3) is integrally attached (for example, by welding, as described below) to the rearward end 80 of the inner hub 76. A mounting flange 77 is also provided on the forward end 78 of the inner hub 76 (see FIGS. 4 and 5) for attaching a forward bearing housing (not shown) for the LP shaft bearings.

The annular inner portion of the intermediate portion 46 of casing 32 also includes a splitter 42, which includes an annular inner wall 85 and an annular outer wall 86 extending axially and downstream relative to the air flow through engine 10, divergent from an annular leading edge tip 88. A section of the annular bypass path 37 is thereby defined between the outer ring 68 and the annular outer wall 86 of the splitter 42, while core flow path 36 is defined between the annular inner wall 85 of the splitter 42 and the inner hub 76. A stiffener 94 is provided within splitter 42, between the inner and outer walls 85, 86, and affixed thereto, and preferably also affixed to struts 40, as will be described further below. As described previously, the compressor shroud 48, which is preferably thicker than the inner wall 85 of the splitter 42 to withstand the demands of the compressed air flow, is integrated (for example by welding, as described further below) to the inner wall 85.

A plurality of circumferentially spaced apart slots 90 extend generally from near the annular tip 88 axially into the splitter 42, for receiving the respective casing struts 40. A plurality of corresponding bosses 91 and 93 are respectively provided in the inner hub 76 and the outer ring 68 for attaching the casing struts 40.

A bleed valve housing 92 (see FIGS. 4 and 6) is preferably attached by welding, to the annular outer wall 86 of the splitter 42 at its rearward end, for securing bleed valve(s) (not shown) thereto. The intermediate portion 46 also includes holes 96 defined in the outer wall 86 of the splitter 42, for co-operation with an air bleed system (not shown). Bleed holes 96 are preferably made when fabricating the splitter 42.

Though when assembled it has the appearance of a prior art intercase, which is most typically cast, the present invention advantageously permits the individual components of intermediate portion 46 may be made in accordance with a variety of manufacturing processes. The preferred processes will now be described. Outer ring 68 and inner hub 76 are machined from solid. Outer ring is generally quite thin (i.e. sheet-metal-like) and, in conjunction with stiffeners 72, provide intercase portion 46 with a semi-monocoque construction which is lightweight yet strong. Service attachments, such oil tube inlet 83 and N1 probe boss 85, are cast (or metal injection moulded, forged, machined, etc., as desired) and welded or brazed to outer ring, while other "attachments" such as tower shaft support 82 are integrally machined with the ring. Struts 40 are formed preferably in sheet metal halves (though processes such as metal injection moulding, hydroforming, flow forming, casting, etc. may be used) and then integrally joined by welding to provide a hollow configuration. One strut preferably receives an AGB tower shaft (not shown), another the oil tube and N1 probe (not shown), and so on. The struts 40 are preferably welded to bosses 91 and 93 and within slots 90, to thereby assemble outer ring 68, splitter 42 and inner hub 70 to provide intercase portion 46 of casing 32.

Figure 9:
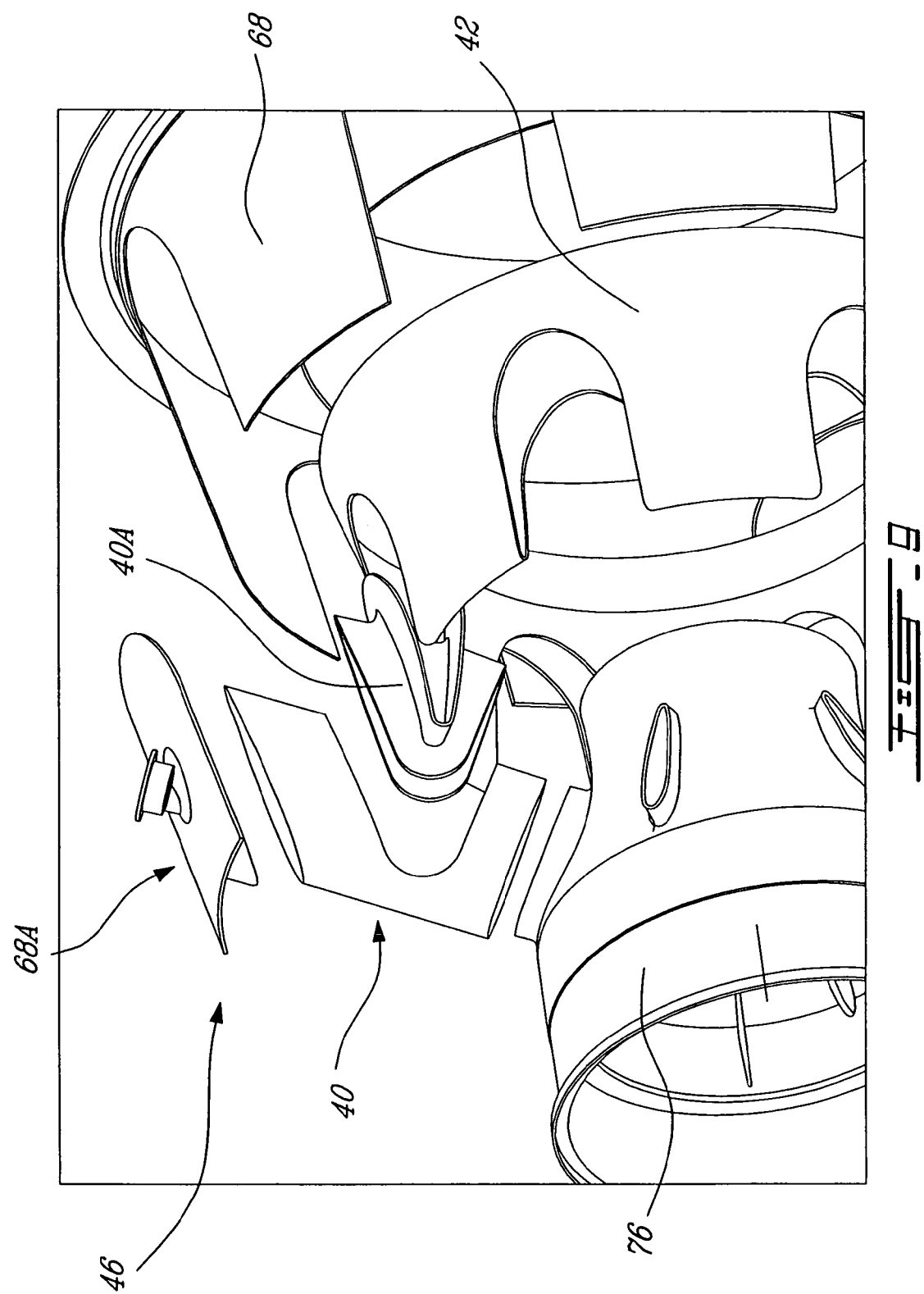
FIG. 9 is an exploded and enlarged isometric front view of a portion of an alternate embodiment of the intercase portion of the present invention.

Referring to FIG. 9, in an alternate embodiment, intercase portion 46 may have struts 40 which have a configuration which provides a modified joint with splitter 42 and outer ring 68, through the inclusion of flanged components 40A and 68A which may be welded to struts 40 and outer ring 68 respectively. Such flanged components may be provided to facilitate stronger connection welds, etc. and thus this embodiments further illustrates the flexibility the present invention gives the designer.

The individual components are integrated together preferably by welding (or other integral joining technique of the general types already mentioned) to provide the integrated intermediate portion 46, and this is preferably before integrating the intermediate portion 46 with the other portions of the casing 32 (i.e. fan portion 44, etc.). The details of the intermediate portion 46 may vary depending on various embodiments used for various engine models.

Referring to FIGS. 4 and 6, the fan portion 44 includes an annular upstream section 98 encircling the fan blades 14 (see FIG. 3). The upstream section 98 is preferably strong enough to ensure containment of a blade-off incident, or incorporate an insert therefor (not shown). The fan case 44 includes a downstream section 100 which extends from the upstream section 98 to a downstream edge 103. The downstream section 100 incorporates slots 101 which locates and supports the outer end of fan exit vanes 38, as will be described below.

Figure 10:
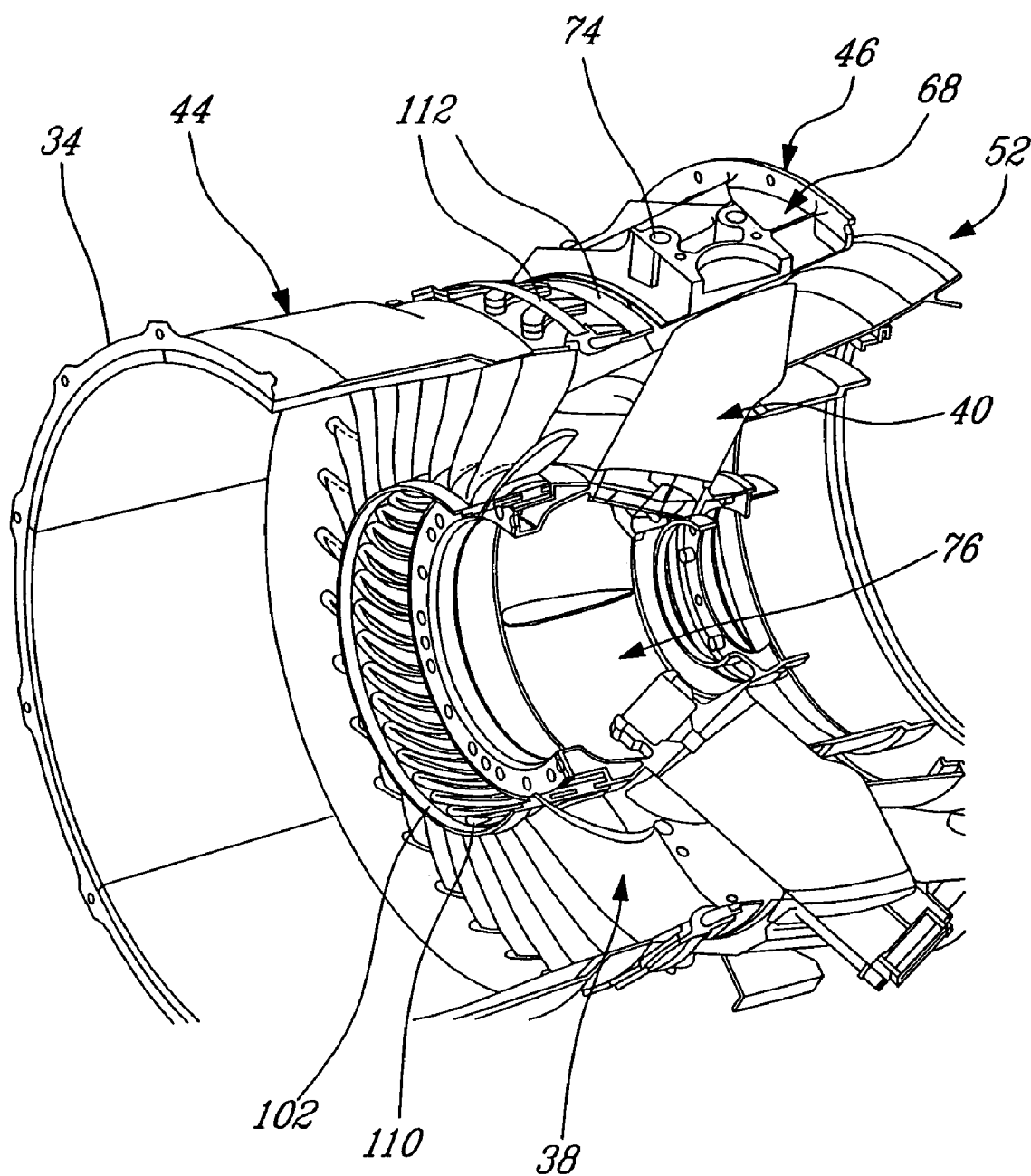
FIG. 10 is an enlarged isometric front view of a cross-section of the assembled case of the present invention.
Figure 11:
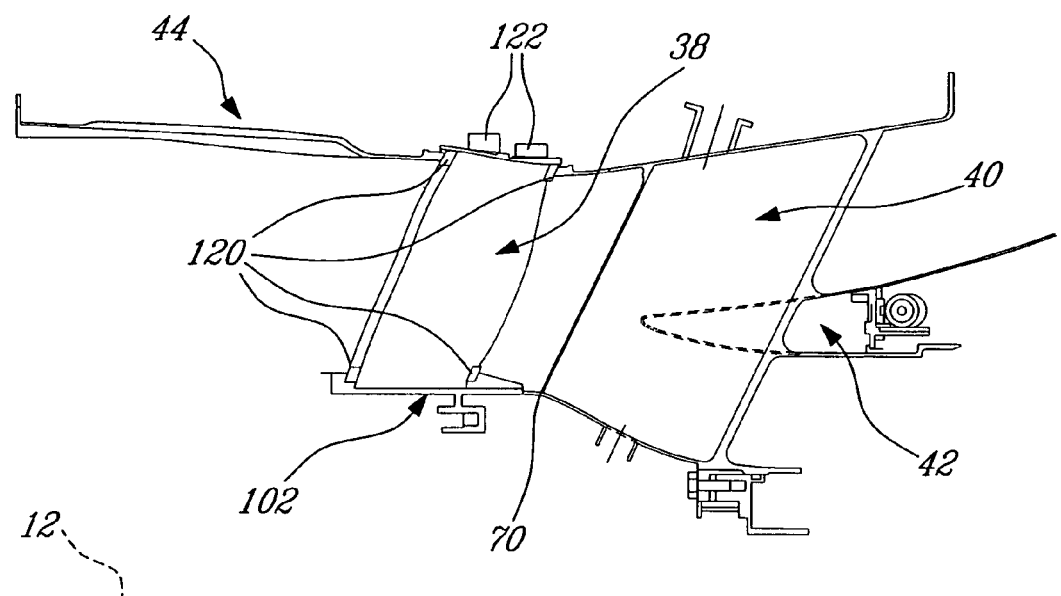
FIG. 11 is an enlarged cross-sectional view of a portion of the present invention showing the fan exit vane installation.

Referring to FIG. 10, the stator-less fan exit vanes 38 are slidingly inserted preferably from outside the fan portion 44 and therefore slots 101 are defined accordingly in the section 100 of the fan portion 44 (see FIG. 6) and in the inner shroud 102. The fan exit vanes 38 are releasably mounted between the section 100 of the fan portion 44 and the inner shroud 102 at the corresponding slots, and releasably retained therein by pliable compression-fit insert grommets 120 (see FIG. 11) and straps 122.

Fan portion 44 may be flow-formed from one material, such as steel, nickel or inconel. Alternate fabrication or forming techniques may also be used, and one or more materials may be used.

The fan portion 44 is integrated into the intermediate portion 46 by integrally joining, preferably by welding, the aft end 103 of fan case portion 44 with the forward end 70 of the outer ring 68 of the intermediate portion 4 to thereby create an integral joint 130 (see FIG. 4). The inner shroud 102 of the fan portion 44 is also attached to the inner hub 76 of the intermediate portion 46, preferably by welding at 132. The inner shroud 102 and the fan exit vanes 38 are preferably not integrated with the casing assembly 32, but rather are releasably mounted to the fan portion 44 as described above after the fan portion 44 is integrated with the intermediate portion 46.

Figure 12:
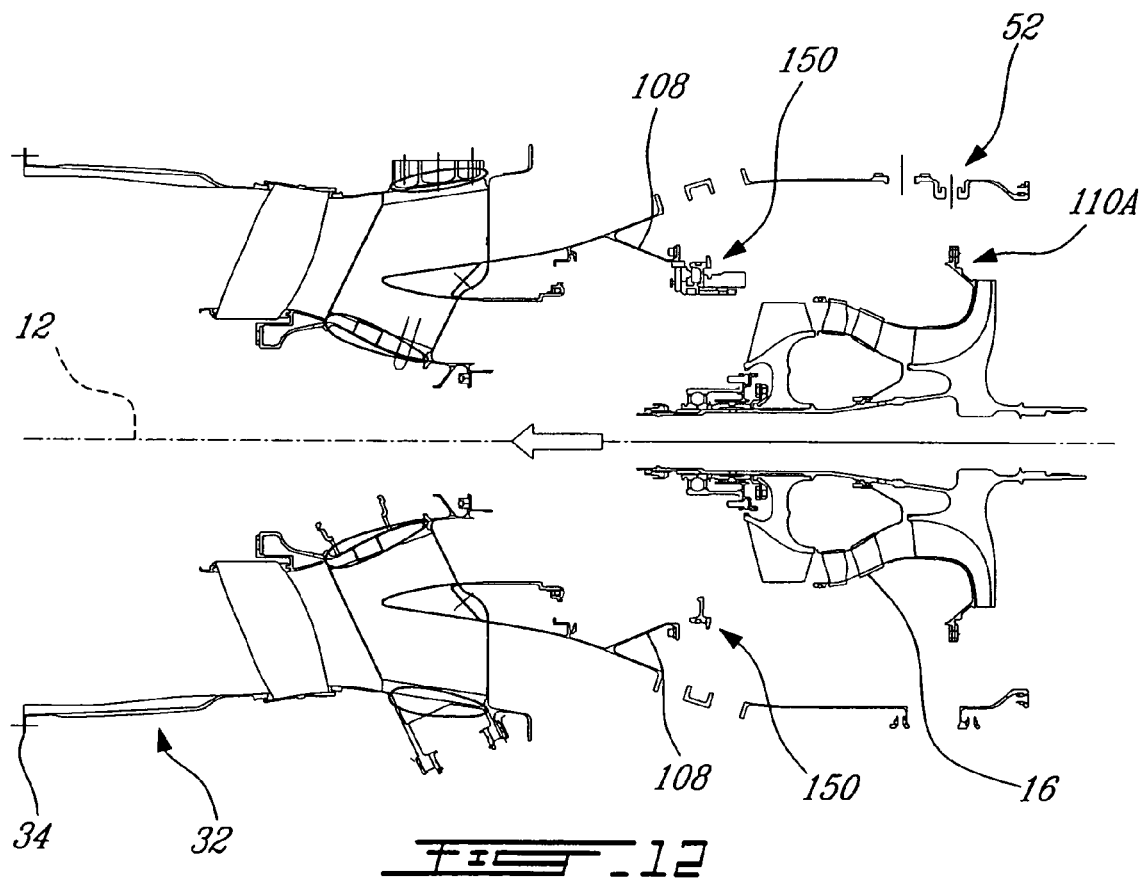
FIG. 12 is a somewhat schematic cross-sectional view showing assembly steps according to the present invention.

The gas generator case portion 52 of casing 32, includes a upstream section 104 and a substantially cylindrical downstream section 106 which are integrated together, preferably by being fabricated in a single manufacturing process. An integral inner ring 108 is disposed within the upstream section 104 and is integrated, preferably by welding, with the gas generator case 52 at the forward end thereof. A mounting flange 110 extends radially outwardly from the inner ring 108 at the inner edge thereof, for securing the diffuser 18 flange 110A and bleed valve 150 thereto (see (FIGS. 3, 4 and 12). A number of openings 140 (see FIG. 6) are provided in the gas generator case 52 for receiving or mounting engine components of the gas generator portion, such as fuel injecting means 30, and so on, as will be understood by one skilled in the art. The downstream cylindrical section 106 has an aft end 107 which is integrated with a radially outwardly extending mounting flange 112, for connection with turbine and/or exhaust case 54. The gas generator case 52 is integrated at the front end thereof with the aft end 89 of the annular outer wall 86 splitter 42 of the intermediate portion 46 at 134, also preferably by welding.

The fan portion 44, the intermediate portion 46 and the gas generator portion 52 of casing 32 are thus fabricated separately, for example by machining from solid, sheet metal fabrication, forging, casting, flow-forming, etc., depending on the design of each and the wishes of the designer. The separately fabricated cases are then integrally attached preferably by welding. It is then preferable to finally machine the interior portions of the integrated casing 32 prior to installation of rotor assemblies, in order to reduce any tolerance stack-up occurring during casing 32 manufacture or assembly. This dramatically reduces the tolerance stack-up over prior art devices.

The way in which each portion is formed and the exact means by which the the portions are attached are not critical to the invention, but rather may be left to the designer's discretion. Therefore, the present invention allows for flexibility in selection of manufacturing processes to meet the designer's needs in providing an integrated case assembly for a very small turbofan engine. The present invention thereby permits a variety of manufacturing techniques, notably among them fabrication techniques such as machining from solid, flow-forming and sheet metal construction, which are not available with prior art casing designs.

In yet another aspect of the present invention, the flexibility of manufacture permitted by the present invention permits the bearing mounts integrally provided in the case to be much simpler, in terms of part count, than prior art bearing mounts. Typical prior art gas turbine engines require complicated bearing mounts, including assemblies known as "squirrel cages" to dampen vibrations caused by rotor imbalances which inevitably result despite highly accurate machining processes. In the present invention however, bearing mounts such as bearing mount 58 may be provided with an integrated flexibility, such that which is a function of its material, configuration, stiffness, etc., such that bearing mount 58 itself can be "tuned" during manufacture to thereby obviate the need for a squirrel cage. The bearing mount 58 is thus integrally designed and provided to also perform a damping function to remove the need for separate squirrel cage assemblies. Since squirrel cages add weight, length and complexity to the engine, deleting this component is of course valuable and therefore yet another beneficial feature of the present invention.

Referring now to FIGS. 5, 6 and 12, in a yet further aspect of the present invention, a method for assembling a turbofan engine will now be described. Unlike the prior art, the present invention casing 32 is preferably fully (or substantially) assembled before any rotating or other gas turbine components are assembled therein. Thus, the first step is making and assembling the components of the casing assembly 32, as described above. The next step, also described above, preferably is to machine internal surfaces of the casing 32, such as surfaces relating to bearing mounts, compressor shrouds and similar surfaces, to remove any accumulated tolerance stack-up which would affect the efficient operation of the engine. The next steps are to insert the fan rotor assembly 13 inside casing 32 (step not shown in the Figures), preferably through the inlet 34 of the fan casing assembly 32 and into the fan portion 44, and to insert the bleed valve 150 and compressor assembly 16 into casing 32, preferably through gas generator portion 52 (see FIG. 12). The diffuser 18, combustor 20, the turbine assemblies, and other components are also inserted into casing 32, also preferably from the aft end of the gas generator portion 52. The assembly process of the engine 10 is then completed by further mounting the turbine and exhaust case 54, the bypass duct 56, and other engine components in and to the casing assembly 32. While the specific order of insertion and assembly of these interior assemblies in casing may depend on preference or the design layout of engine 10, the present invention involves building the core of engine 10 inside a completed or substantially completed casing 32, thereby permitting an overall more efficient assembly technique for the gas turbine engine.

The present method also advantageously provides a fast assembly of a gas turbine engine because no fixtures such as flange connections are required and therefore, less "final" assembly steps are required.

As mentioned, the present invention has particular application for use in so-called very small gas turbine engines, namely engines typically 2000 pounds thrust and below for use in general aviation aircraft sometimes referred to as "personal" jet aircraft. This market represents a leading edge of gas turbine turbofan technology, wherein the limits of scaling and cost-effective design and operation are challenged. Prior art small turbines, such as those used in missile engines are simply unsuitable. Missile engines are invariably expensive to make and operate (owing to their military heritage), and are designed for extremely short operational lives (a few hours) in which they are continuously operated at full thrust. The very small turbofan as contemplated herein, however, must of course be operated intermittently at varying thrust levels (e.g. idle, taxi, take-off, climb, cruise, approach and landing) for thousands of hours, not to mention be affordable and quiet to operate and environmentally friendly. Likewise, although microturbines are beginning to proliferate in the power generation field, this technology is also largely unsuitable since aircraft applications require extremely lightweight and reliable designs which are typically not found in industrial microturbine designs. Accordingly, the present invention represents an advance in the field of providing an affordable-to-operate turbofan to general aviation pilots.

The present invention permits a turbofan casing to be provided which, in the very small turbofan size range, permits the overall weight of the casing to be reduced over conventional larger designs. The weight reduction is due in part to the thin shell stiffened semi-monocoque design of the intermediate case section, which has an integrally-stiffened thin shell construction which allows the designer to optimize the use of metal to thereby reduce weight. The thin "sheet" outer ring "panels" are reinforced at specific locations by the ribs and struts, and by engine mounts and other similar features on the ring, to balance external loading by compression and tension in the reinforcing members reacting balanced shear in the "panels" of the outer ring. This provides a stable structure with a stiffness comparable to a cast structure more than 500% thicker. It is through this approach, combined with the simplicity of attachment, that the overall weight of the casing is significantly reduced.

While the above description addresses the preferred embodiments, it will be appreciated that the present invention is susceptible to modification and change without departing from the scope of the accompanying claims. For example, while described in respect of an application to very small turbofan engines, some benefits may be attained in larger turbofan or other gas turbine engines in applying the principles of the present invention. Though the use of certain materials and manufacturing methods have been disclosed as preferred, other materials and methods may be substituted without departing from the present invention. The turbine and exhaust cases may also be integrated if desired into a casing according to the present invention, either together with, or in place of some of the components described above. For example, an integrated fan and intermediate case could be attached in a conventional fashion to an integrated gas generator and turbine case. The compressor shroud integrated with the casing could be an LP or HP compressor shroud. Still other modifications will be apparent to those skilled in the art which will fall within the scope of the invention intended by the inventors, and the appended claims should be interpreted to incorporate such modifications.

We claim:

1. A casing for a non-expendable turbofan engine, substantially encasing at least a fan assembly, a compressor assembly, a combustor assembly and a turbine assembly, the casing comprising:
   a fan case portion surrounding the fan assembly;
   an annular intermediate case portion having an annular outer portion aligned with and projecting axially rearwardly from the fan case portion and an annular inner portion; and
   a gas generator case portion aligned with and extending axially rearwardly from the intermediate case annular inner portion and housing the combustor assembly,
   wherein the fan case portion, the intermediate case annular outer and inner portions and the gas generator case portion are integrally joined together, thereby forming an integral casing.

2. The casing as claimed in claim 1 wherein the fan case portion, the intermediate case portion and the gas generator case portion are made of the same material.

3. The casing as claimed in claim 1 wherein the intermediate case portion further comprises an integral compressor shroud portion and an integral bearing mount portion.

4. The casing as claimed in claim 1 wherein a first weld joins the fan case portion to the intermediate case portion, and wherein a second weld joints the gas generator case portion to the intermediate case portion.

5. The casing as claimed in claim 1 wherein the fan case portion, the intermediate case portion and the gas generator case portion are joined together by flangeless connections.

6. The casing as claimed in claim 1, wherein the intermediate case portion comprises a splitter including inner and outer annular walls extending axially rearwardly from a leading edge tip, the outer annular wall forming a radially inner boundary of a bypass air flow, the inner annular wall forming a radially outer boundary of a main gas path of the turbofan engine.

7. The casing as claimed in claim 1, wherein the fan case portion has an inner shroud which is integrally connected to an inner hub of the intermediate case portion.

8. A non-expendable turbofan engine comprising a casing as defined in claim 1.

* * * * *